(12) United States Patent
Tang et al.

(10) Patent No.: US 11,423,673 B2
(45) Date of Patent: Aug. 23, 2022

(54) METHOD AND DEVICE FOR DETECTING STATE OF HOLDING STEERING WHEEL

(71) Applicant: ArcSoft Corporation Limited, Zhejiang (CN)

(72) Inventors: Chen Tang, Zhejiang (CN); Zhiwei Zhang, Zhejiang (CN); Xiaodi Zhang, Zhejiang (CN); Chunhui Ding, Zhejiang (CN); Jin Wang, Zhejiang (CN)

(73) Assignee: ArcSoft Corporation Limited, Zhejiang (CN)

( * ) Notice: Subject to any disclaimer, the term of this patent is extended or adjusted under 35 U.S.C. 154(b) by 0 days.

(21) Appl. No.: 17/054,179

(22) PCT Filed: Mar. 17, 2020

(86) PCT No.: PCT/CN2020/079742
§ 371 (c)(1),
(2) Date: Nov. 10, 2020

(87) PCT Pub. No.: WO2020/192498
PCT Pub. Date: Oct. 1, 2020

(65) Prior Publication Data
US 2022/0004788 A1 Jan. 6, 2022

(30) Foreign Application Priority Data
Mar. 28, 2019 (CN) .......................... 201910245398.8

(51) Int. Cl.
*G06K 9/00* (2022.01)
*G06V 20/59* (2022.01)
(Continued)

(52) U.S. Cl.
CPC .............. *G06V 20/597* (2022.01); *G06T 7/50* (2017.01); *G06T 7/70* (2017.01); *G06V 10/25* (2022.01);
(Continued)

(58) Field of Classification Search
CPC ........... G06K 9/00845; G06K 9/00355; G06K 9/00375; G06K 9/00711; G06K 9/3233;
(Continued)

(56) References Cited

U.S. PATENT DOCUMENTS 9,248,851 B2 * 2/2016 Van'tZelfde .............. G01L 1/00
2014/0245858 A1 9/2014 Johnson
(Continued)

FOREIGN PATENT DOCUMENTS

CN 102263937 A 11/2011
CN 104276080 A 1/2015
(Continued)

OTHER PUBLICATIONS

T. Hoang Ngan Le, "Multiple Scale Faster—RCNN approach to driver's cell phone usage and hands on steering wheel detection" (Year: 2016).*
(Continued)

*Primary Examiner* — Dhaval V Patel
(74) *Attorney, Agent, or Firm* — Gang Yu

(57) ABSTRACT

The present disclosure discloses a method and device for detecting a state of holding a steering wheel, wherein the method includes: a detection result is obtained by detecting a video stream collected from a target vehicle; an associated state of the first ROI information and the second ROI information in the two-dimensional plane carried in the detection result is obtained, wherein the first ROI information is ROI information about the steering wheel of the target vehicle, and the second ROI information is ROI information
(Continued)

about the driver's hand of the target vehicle; a current state between the hand of the driver and the steering wheel of the target vehicle is determined according to the associated state. Then, the disclosure solves the technical problem in the related art that it is impossible to detect the grasping state of the steering wheel by the driver while driving.

18 Claims, 4 Drawing Sheets

(51) Int. Cl.
*G06T 7/50* (2017.01)
*G06T 7/70* (2017.01)
*G06V 10/25* (2022.01)
*G06V 40/20* (2022.01)
*G06V 20/40* (2022.01)
*G06V 40/10* (2022.01)

(52) U.S. Cl.
CPC ............ *G06V 20/40* (2022.01); *G06V 40/107* (2022.01); *G06V 40/28* (2022.01); *G06T 2207/10016* (2013.01); *G06T 2207/30268* (2013.01)

(58) Field of Classification Search
CPC ... G06T 7/50; G06T 7/70; G06T 2207/10016; G06T 2207/30268
See application file for complete search history.

(56) References Cited

U.S. PATENT DOCUMENTS

2017/0344838 A1* 11/2017 Zhou .......................... G06T 7/77
2019/0246036 A1* 8/2019 Wu ..................... G06K 9/00604

FOREIGN PATENT DOCUMENTS

CN 109034111 A 12/2018
WO 2018161980 A1 9/2018

OTHER PUBLICATIONS

CN search report re: Application No. 201910245398.8.

* cited by examiner

METHOD AND DEVICE FOR DETECTING STATE OF HOLDING STEERING WHEEL

TECHNICAL FIELD

The present disclosure relates to the technical field of image detection, and in particular to a method and device for detecting a state of holding a steering wheel.

BACKGROUND

At present, vehicles have become a very common means of transportation. The number of private cars and transportation vehicles has grown rapidly, thus bringing convenience to people's lives. At the same time, the driver's ability and experience are uneven, insufficient safety awareness and excessive fatigue driving may cause many traffic problems. According to accident statistics, a large proportion of traffic accidents are caused by drivers distracted by phone calls, sending messages, eating, etc. while driving. When doing these behaviors that interfere with driving, one or both hands of the driver leave the steering wheel and lose full control of the steering wheel. There is a big difference in the distraction between the presence and absence of hands on the steering wheel. When a danger occurs, it is difficult for the driver to immediately response to the risk and cause an accident. At present, it is impossible to monitor and alarm the driver's hand off the steering wheel.

In view of the above problem of the related technologies that cannot detect the state of holding the steering wheel while driving, no effective solution has been proposed yet.

SUMMARY

The present disclosure provides a method and device for detecting a state of holding a steering wheel, at least solving the technical problem that the related technologies cannot detect the state of holding the steering wheel while driving the vehicle.

According to at least one alternative embodiment, a method for detecting a state of holding a steering wheel is provided, including: obtaining a detection result by detecting a video stream collected from a target vehicle; acquiring an associated state of first Region of Interest (ROI) information and second ROI information carried in the detection result in a two-dimensional plane, wherein the first ROI information is ROI information about the steering wheel of the target vehicle, and the second ROI information is ROI information about a hand of a driver driving the target vehicle; determining a current state between the hand of the driver and the steering wheel of the target vehicle according to the associated state.

According to at least one alternative embodiment, the video stream includes at least one of following: a depth video stream, an Infrared Radiation (IR) video stream, and a Red Green Blue (RGB) video stream.

According to at least one alternative embodiment, obtaining the detection result by detecting the video stream collected from the target vehicle includes: detecting an image in the video stream, and acquiring a steering wheel position of the target vehicle and a hand position of the driver to obtain the detection result.

According to at least one alternative embodiment, acquiring the associated state of the first ROI information and the second ROI information carried in the detection result in the two-dimensional plane includes: classifying a positional relationship between the steering wheel position and the hand position of the driver into different categories by a pre-trained classification model, wherein the categories include: the hand position is on the steering wheel position, and the hand position is off the steering wheel position.

According to at least one alternative embodiment, acquiring the associated state of the first ROI information and the second ROI information carried in the detection result, in the two-dimensional plane includes: comparing a first threshold and a coincidence rate between the steering wheel position and the hand position of the driver in the two-dimensional plane as to determine a collective state of the first ROI information and the second ROI information in the two-dimensional plane, wherein the collective state is used to indicate whether there is an intersection between the first ROI information and the second ROI information in the two-dimensional plane.

According to at least one alternative embodiment, the method further including: acquiring depth information of the first ROI information carried in the detection result and depth information of the second ROI information carried in the detection result, and determining a depth state of the first ROI information and the second ROI information, wherein the depth state of the first ROI information and the second ROI information is used to indicate whether a depth range of the first ROI information and a depth range of the second ROI information is consistent.

According to at least one alternative embodiment, the method further including: determining by a region growing method, whether the hand position and the steering wheel position is able to grow into a connected region according to the depth information of the first ROI information and the depth information of the second ROI information, as to determine the current state between the hand of the driver and the steering wheel of the target vehicle.

According to at least one alternative embodiment, acquiring the depth information of the first ROI information carried in the detection result and the depth information of the second ROI information carried in the detection result, and determining the depth state of the first ROI information and the second ROI information includes: obtaining a depth model of the steering wheel position by modeling according to a depth of the steering wheel position; acquiring an actual depth of the hand position and a theoretical depth of the hand position in the depth model; determining the depth state of the steering wheel position and the hand position according to the actual depth and the theoretical depth of the hand position.

According to at least one alternative embodiment, detecting the image in the video stream to obtain the steering wheel position of the target vehicle includes: determining an initial steering wheel position of the target vehicle, and detecting within the initial position according to the image in the video stream, as to obtain the steering wheel position of the target vehicle.

According to at least one alternative embodiment, detecting the image in the video stream to obtain the hand position of the driver includes: obtaining the hand position of the driver corresponding to the image in the video stream through a positioning model, wherein the positioning model is obtained by training multiple sets of training data, and each set of training data in the multiple sets of training data includes: an image in the video stream and a hand position of the driver corresponding to the image in the video stream.

According to at least one alternative embodiment, detecting the image in the video stream to obtain the hand position of the driver includes: detecting the image in the video stream and locating to obtain an arm position of the driver;

correcting according to the arm position, the hand position obtained by the positioning model, as to obtain the hand position.

According to at least one alternative embodiment, the arm position of the driver is represented by three-dimensional information of a predetermined number of points along an arm detected from the image in the video stream.

According to at least one alternative embodiment, determining the current state between the hand of the driver and the steering wheel of the target vehicle according to the associated state includes: determining the current state between the hand of the driver and the steering wheel of the target vehicle is a solid grip state when the hand position is on the steering wheel position or the collective state indicates that the first ROI information intersects with the second ROI information in the two-dimensional plane; determining the current state between the hand of the driver and the steering wheel of the target vehicle is a disengaged state when the hand position is off the steering wheel position or the collective state indicates that the first ROI information doesn't intersect with the second ROI information in the two-dimensional plane.

According to at least one alternative embodiment, the method further including: determining the current state between the hand of the driver and the steering wheel of the target vehicle according to the associated state and the depth state.

According to at least one alternative embodiment, determining the current state between the hand of the driver and the steering wheel of the target vehicle according to the associated state and the depth state includes: determining the current state between the hand of the driver and the steering wheel of the target vehicle is a disengaged state when the collective state indicates that the first ROI information does not intersect with the second ROI information in the two-dimensional plane; determining the current state between the hand of the driver and the steering wheel of the target vehicle is a virtual grip state when the collective state indicates that the first ROI information intersects with the second ROI information in the two-dimensional plane, and the depth state indicates that the depth range of the first ROI information and the depth range of the second ROI information is inconsistent; determining the current state between the hand of the driver and the steering wheel of the target vehicle is a solid grip state when the collective state indicates that the first ROI information intersects with the second ROI information in the two-dimensional plane, and the depth state indicates that the depth range of the first ROI information and the depth range of the second ROI information is consistent.

According to at least one alternative embodiment, determining the current state between the hand of the driver and the steering wheel of the target vehicle according to the associated state and the depth state includes: determining the current state between the hand of the driver and the steering wheel of the target vehicle is a virtual grip state when the hand position is on the steering wheel position, and the depth state indicates that the depth range of the first ROI information and the depth range of the second ROI information is inconsistent; determining the current state between the hand of the driver and the steering wheel of the target vehicle is a solid grip state when the hand position is on the steering wheel position, and the depth state indicates that the depth range of the first ROI information and the depth range of the second ROI information is consistent; determining the current state between the hand of the driver and the steering wheel of the target vehicle is a disengaged state when the hand position is off the steering wheel position.

According to at least one alternative embodiment, the current state between the hand of the driver and the steering wheel of the target vehicle includes one of following: two hands off the steering wheel, one hand off the steering wheel, two-hand virtual grip state, one-hand virtual grip state, two-hand solid grip state.

According to at least one alternative embodiment, before acquiring the associated state of the first ROI information and the second ROI information carried in the detection result in the two-dimensional plane, further including: detecting the number of a hand; acquiring an associated state of the steering wheel position and a hand position of each hand of the driver in the two-dimensional plane when the detected number of the hand is two.

According to at least one alternative embodiment, a device for detecting a state of holding a steering wheel is provided, including: a detecting element, configured to obtain a detection result by detecting a video stream collected from a target vehicle; an acquiring element, configured to acquire an associated state of first Region of Interest (ROI) information and second ROI information carried in the detection result in a two-dimensional plane, wherein the first ROI information is ROI information about the steering wheel of the target vehicle, and the second ROI information is ROI information about a hand of a driver driving the target vehicle; a determining element, configured to determine a current state between the hand of the driver and the steering wheel of the target vehicle according to the associated state.

According to at least one alternative embodiment, the video stream includes at least one of following: a depth video stream, an Infrared Radiation (IR) video stream, and a Red Green Blue (RGB) video stream.

According to at least one alternative embodiment, the detecting element is configured to detect an image in the video stream collected, acquire a steering wheel position of the target vehicle and a hand position of the driver to obtain the detection result.

According to at least one alternative embodiment, the acquiring element includes: an associated state acquiring component, configured to classify a positional relationship between the steering wheel position and the hand position of the driver into different categories by a pre-trained classification model, wherein the categories include: the hand position is on the steering wheel position, and the hand position is off the steering wheel position.

According to at least one alternative embodiment, the acquiring element includes: an associated state acquiring component, configured to compare a first threshold and a coincidence rate between the steering wheel position and the hand position of the driver in the two-dimensional plane, as to determine a collective state of the first ROI information and the second ROI information in the two-dimensional plane, wherein the collective state is used to indicate whether there is an intersection between the first ROI information and the second ROI information in the two-dimensional plane.

According to at least one alternative embodiment, the acquiring element further includes: a depth state acquiring component, configured to acquire depth information of the first ROI information carried in the detection result and depth information of the second ROI information carried in the detection result, and determine a depth state of the first ROI information and the second ROI information, wherein the depth state of the first ROI information and the second ROI information is used to indicate whether a depth range of the first ROI information and a depth range of the second ROI information is consistent.

According to at least one alternative embodiment, the depth state acquiring component is further configured to determine by a region growing method, whether the hand position and the steering wheel position is able to grow into a connected region according to the depth information of the first ROI information and the depth information of the second ROI information, as to determine the current state between the hand of the driver and the steering wheel of the target vehicle.

According to at least one alternative embodiment, the depth state acquiring component includes: a modeling sub-component: configured to obtain a depth model of the steering wheel position by modeling according to a depth of the steering wheel position; an acquiring sub-component: configured to acquire an actual depth of the hand position and a theoretical depth of the hand position in the depth model; a determining sub-component: configured to determine the depth state of the steering wheel position and the hand position according to the actual depth and the theoretical depth of the hand position.

According to at least one alternative embodiment, the detecting element includes: a steering wheel position detecting component: configured to determine an initial steering wheel position of the target vehicle, and detect within the initial steering wheel position according to the image in the video stream, as to obtain the steering wheel position of the target vehicle.

According to at least one alternative embodiment, the detecting element includes: a hand position detecting component, configured to obtain the hand position of the driver corresponding to the image in the video stream through a positioning model, wherein the positioning model is obtained by training multiple sets of training data, and each set of training data in the multiple sets of training data includes: an image in the video stream and a hand position of the driver corresponding to the image in the video stream.

According to at least one alternative embodiment, the detecting element includes: an arm position detecting component, configured to detect the image in the video stream and locate to obtain an arm position of the driver; a hand position correcting component, configured to correct according to the arm position, the hand position obtained by the positioning model as to obtain the hand position.

According to at least one alternative embodiment, the determining element includes: a first determining sub-element, configured to determine the current state between the hand of the driver and the steering wheel of the target vehicle is a solid grip state when the hand position is on the steering wheel position or the collective state indicates that the first ROI information intersects with the second ROI information in the two-dimensional plane; a second determining sub-element, configured to determine the current state between the hand of the driver and the steering wheel of the target vehicle is a disengaged state when the hand position is off the steering wheel position or the collective state indicates that the first ROI information doesn't intersect with the second ROI information in the two-dimensional plane.

According to at least one alternative embodiment, the determining element further includes: a third determining sub-element, configured to determine the current state between the hand of the driver and the steering wheel of the target vehicle is a disengaged state when the collective state indicates that the first ROI information does not intersect with the second ROI information in the two-dimensional plane; a fourth determining sub-element, configured to determine the current state between the hand of the driver and the steering wheel of the target vehicle is a virtual grip state when the collective state indicates that the first ROI information does not intersect with the second ROI information in the two-dimensional plane, and the depth state indicates that the depth range of the first ROI information and the depth range of the second ROI information is inconsistent; a fifth determining sub-element, configured to determine the current state between the hand of the driver and the steering wheel of the target vehicle is a solid grip state when the collective state indicates that the first ROI information intersects with the second ROI information in the two-dimensional plane, and the depth state indicates that the depth range of the first ROI information and the depth range of the second ROI information is consistent.

According to at least one alternative embodiment, the determining element further includes: a sixth determining sub-element, configured to determine the current state between the hand of the driver and the steering wheel of the target vehicle is a virtual grip state when the hand position is on the steering wheel position, and the depth state indicates that the depth range of the first ROI information and the depth range of the second ROI information is inconsistent; a seventh determining sub-element, configured to determine the current state between the hand of the driver and the steering wheel of the target vehicle is a solid grip state when the hand position is on the steering wheel position, and the depth state indicates that the depth range of the first ROI information and the depth range of the second ROI information is consistent; an eighth determining sub-element, configured to determine the current state between the hand of the driver and the steering wheel of the target vehicle is a disengaged state when the hand position is off the steering wheel position.

According to at least one alternative embodiment, the current state between the hand of the driver and the steering wheel of the target vehicle includes one of following: two hands off the steering wheel, one hand off the steering wheel, two-hand virtual grip state, one-hand virtual grip state, two-hand solid grip state.

According to at least one alternative embodiment, the acquiring element is further configured to detect the number of a hand before the associated state of the first ROI information and the second ROI information carried in the detection result in the two-dimensional plane is acquired; acquire an associated state of the steering wheel position and a hand position of each hand of the driver in the two-dimensional plane when the detected number of the hand is two.

According to at least one alternative embodiment, a storage medium is provided, including a stored program, wherein the program executes the at least one of the above methods for detecting the state of holding the steering wheel.

According to at least one alternative embodiment, a processor is provided, wherein the processor is configured to execute a program, wherein the program performs the at least one of above methods for detecting the state of holding the steering wheel when executed.

According to the present disclosure, a detection result is obtained by detecting the video stream collected from the target vehicle; and the associated state of the first ROI information and the second ROI information carried in the detection result, in the two-dimensional plane is acquired, wherein the first ROI information is ROI information of the steering wheel of the target vehicle, and the second ROI information is ROI information of a hand of the driver driving the target vehicle; and a current state between the hand of the driver and the steering wheel of the target vehicle according to the associated state is determined. The state of holding the steering wheel by the driver's hand is detected, the state of the hand of the driver and the steering wheel of the target vehicle is determined by the first ROI information of the hand of the driver and the second ROI information of the steering wheel obtained by image analysis, the technical effect of improving the accuracy of detecting the state between the hand of the driver and the steering wheel is achieved, thereby solving the technical problem that the related technology cannot detect the state of the holding the steering wheel while driving.

BRIEF DESCRIPTION OF THE DRAWINGS

The drawings described herein are used to provide a further understanding of the present disclosure and form a part of the present application. The schematic embodiments of the present disclosure and their descriptions are used to explain the present disclosure and do not constitute an undue limitation on the present disclosure, in which.

DETAILED DESCRIPTION OF THE EMBODIMENTS

Figure 1:
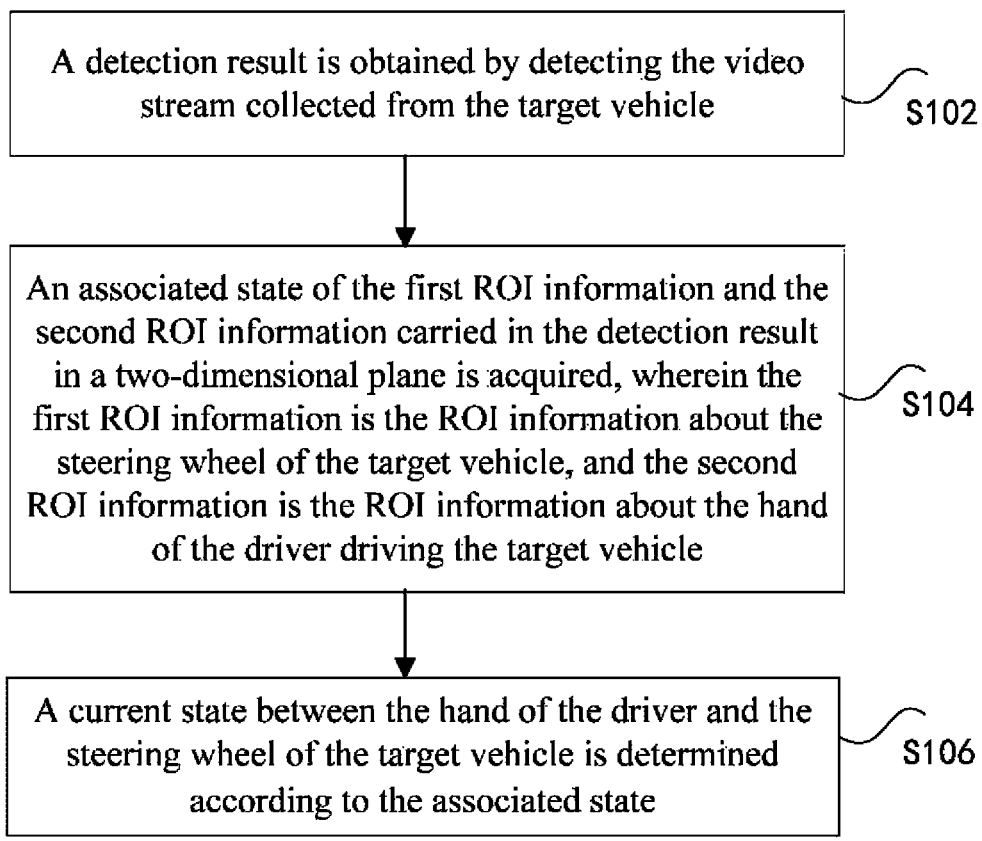
FIG. 1 is a flowchart of a method for detecting a state of holding a steering wheel provided by the embodiment of the present disclosure.

In order to enable those skilled in the art to better understand the solutions of the present disclosure, the technical solutions in the embodiments of the present disclosure will be described clearly and completely in conjunction with the drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

It is be explained is, the terms "a first", "a second", etc. in the claims, embodiments and figures is used to distinguish different objects and not to limit particular order. It should be understood that the data used in this way may be interchanged under appropriate circumstances so that the embodiments of the present disclosure described herein can be implemented in an order other than those illustrated or described herein. In addition, the terms "including" and "having" and any variations of them are intended to cover non-exclusive inclusions. For example, processes, methods, systems, products or devices that contain a series of steps or units need not be limited to those clearly listed steps or units, but may include other steps or units not explicitly listed or inherent to these processes, methods, products or equipment.

With the development of the Advanced Driver Assistance System (ADAS), drivers may rely on the ADAS in many cases, but if they place too much reliance on the ADAS system, the risk of misuse of the system is more likely to occur. For example, the vehicle is able to be controlled by an autonomous steering system in the case of low speed, reverse or parking, and it is acceptable to keep the hand off the steering wheel. However, the driver needs to concentrate on driving the vehicle while driving on high-speed roads where ADAS only may be assisted. At this time, there is no possibility that the hands are off the steering wheel. Therefore, the ADAS needs to add the detection whether the hands are off the steering wheel, as to provide the appropriate assistance in the different cases.

In the related art, the method for detecting whether the hands are off the steering wheel is performed on a hardware. For example, the detection by the hardware refers to that the state of driver's grip on the steering wheel is directly detected by a capacitive sensor. The advantage is that the sensor is in direct contact with the driver, and the result obtained is accurate and responsive. However, it often leads to a higher cost of the detection system.

Embodiment 1

According to an embodiment of the present disclosure, a method for detecting a state of holding a steering wheel is provided. It is to be explained that steps shown in the flowchart of the drawings may be executed in a computer system such as a set of computer-executable instructions, and although the logical sequence is shown in the flowchart, in some cases, the steps shown or described may be performed in a different order than here.

FIG. 1 is a flowchart of a method for detecting a state of holding a steering wheel provided by the embodiment of the present disclosure. As shown in FIG. 1, the method for detecting the state of holding the steering wheel includes the following steps:

Step S102, a detection result is obtained by detecting the video stream collected from the target vehicle.

The above video stream may include at least one of the following: a depth video stream, an IR video stream, and an RGB video stream, wherein the IR is the abbreviation of Infrared Radiation which is a wireless communication method that can perform the wireless transmit on data. Since the light in the car (for example, the cab) usually changes according to the driving environment, the light in the car (for example, the cab) is brighter during the day when the weather is fine. Besides, at night or cloudy days or in the tunnel, the light in the car (for example, the cab) is dark. Since the infrared camera is less affected by changes in light and may work around the clock, an infrared camera (including a near-infrared camera, etc.) is selected to obtain an infrared IR video stream with better quality than the quality of the video stream obtained by the ordinary camera, thereby improving the accuracy of the detection results.

In addition, in the embodiment of the present disclosure, the installation position of the collection device for collecting the video stream is not particularly limited, as long as the above video stream can be collected. A collection perspective includes the top-down perspective of the target vehicle, the perspective of the first person, and the perspective of the third person. The above-mentioned collection device may be a road-monitoring device, for example, a monitoring device at a road checkpoint.

In addition, obtaining the detection result by detecting the video stream collected from the target vehicle may include: the image in the video stream is detected, the steering wheel position of the target vehicle and the hand position of the driver are acquired to obtain the detection result.

As at least one alternative embodiment, detecting the image in the video stream to acquire the steering wheel position of the target vehicle includes: the initial steering wheel position of the target vehicle is determined, and the steering wheel position of the target vehicle is obtained according to the image in the video stream by detecting within the initial position.

On the other hand, detecting the image in the video stream to obtain the hand position of the driver includes: the hand position of the driver corresponding to the image in the video stream is acquired by a positioning model, wherein the positioning model is obtained by training multiple sets of training data. Each set of training data in the multiple sets of training data includes: an image in the video stream and a hand position of the driver corresponding to the image in the video stream.

Step S104, an associated state of the first ROI information and the second ROI information carried in the detection result in a two-dimensional plane is acquired, wherein the first ROI information is the ROI information about the steering wheel of the target vehicle, and the second ROI information is the ROI information about the hand of the driver driving the target vehicle.

That is, the above detection result may also carry the ROI information about the steering wheel of the target vehicle and the ROI information about the driver's hand of the target vehicle.

In at least one alternative embodiment, acquiring the associated state of the first ROI information and the second ROI information carried in the detection result in the two-dimensional plane includes: the positional relationship between the steering wheel position and the hand position of the driver is classified into different categories by a pre-trained classification model, wherein the categories include: the hand position is on the steering wheel position, and the hand position is off the steering wheel position. For example, the hand position off the steering wheel position may include the hand position below or adjacent to the steering wheel.

In at least one alternative embodiment, acquiring the associated state of the first ROI information and the second ROI information carried in the detection result in the two-dimensional plane includes: the coincidence rate of the steering wheel position with the hand position of the driver in the two-dimensional plane is compared with the first threshold, as to determine the collective state of the first ROI information and the second ROI information in the two-dimensional plane, wherein the collective state is used to indicate whether there is an intersection between the first ROI information and the second ROI information in the two-dimensional plane.

For example, the coincidence rate of the steering wheel position with the hand position of the driver in the two-dimensional plane may be compared with the first threshold. When the comparison result is that the coincidence rate of the steering wheel position with the hand position of the driver in the two-dimensional plane is greater than the first threshold, that the hand position is at the steering wheel position may be determined; when the comparison result is that the coincidence rate of the steering wheel position and the hand position of the driver in the two-dimensional plane is not greater than the first threshold, that the hand position is off the steering wheel position may be determined, thereby determining the positional relationship between the hand of the driver and the steering wheel of the target vehicle.

Step S106, a current state between the hand of the driver and the steering wheel of the target vehicle is determined according to the associated state.

For example, determining the current state between the hand of the driver and the steering wheel of the target vehicle according to the associated state includes: the current state between the hand of the driver and the steering wheel of the target vehicle may be determined to be a solid grip state when the hand position is on the steering wheel position; the current state between the hand of the driver and the steering wheel of the target vehicle may be determined to be a disengaged state when the hand position is off the steering wheel position.

Through the above steps, the video stream collected from the target vehicle may be detected to obtain the detection result; then the associated state of the first ROI information and the second ROI information carried in the detection result in the two-dimensional plane is acquired, wherein the first ROI information is the ROI information about the steering wheel of the target vehicle, and the second ROI information is the ROI information about the hand of the driver driving the target vehicle; and the current state between the hand of the driver and the steering wheel of the target vehicle may be determined according to the associated state. In the embodiment, the video stream collected from the target vehicle may be detected to obtain the detection result, then the associated state of the first ROI information and the second ROI information in the two-dimensional plane may be acquired, and the current state between the hand of the driver and the steering wheel of the target vehicle may be determined according to the associated state, which realizes to determine the state of the hand of the driver and the steering wheel of the target vehicle according to the first ROI information about the hand of the driver and the second ROI information about the hand of the driver driving the target vehicle resulted from image analysis, achieving the technical effect of improving the accuracy of detecting the state between the hand of the driver and the steering wheel, thereby solving the technical problem that the related technology cannot detect the state of holding the steering wheel while driving. In order to further improve the detection accuracy of the state of holding the steering wheel, in the embodiment of the present disclosure, whether the depth range of the hand of the driver and the depth range of the steering wheel of the target vehicle is consistent may be determined according to the depth information of the hand of the driver and the depth information of the steering wheel of the target vehicle obtained from the, as to determine that the current state between the hand of the driver and the steering wheel of the target vehicle is a real grip state, a virtual grip state, or a disengaged state. The following detailed description will be made accompanying with the following embodiments.

Embodiment 2

According to the embodiment of the present disclosure, a method for detecting a state of holding a steering wheel is provided. It is to be explained that steps shown in the flowchart of the drawings can be executed in a computer system such as a set of computer-executable instructions, and although the logical sequence is shown in the flowchart, in some cases, the steps shown or described can be performed in a different order than here.

Figure 2:
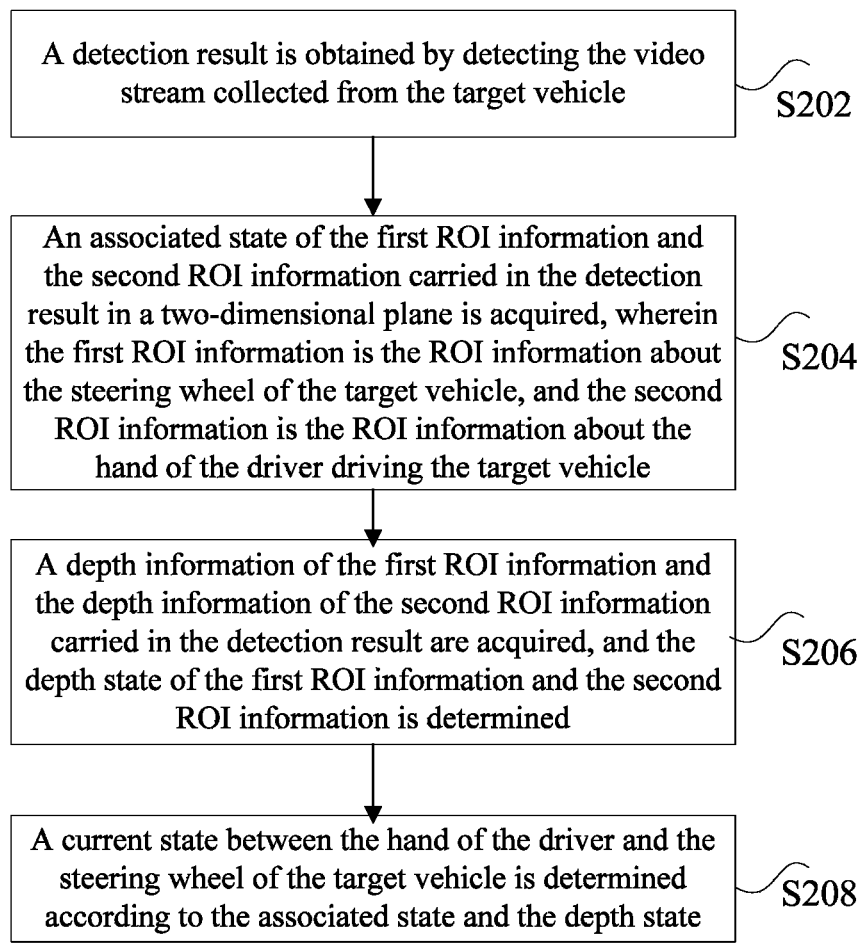
FIG. 2 is a flowchart of an alternative method for detecting a state of holding a steering wheel provided by the embodiment of the present disclosure.

FIG. 2 is a flowchart of an alternative method for detecting a state of holding a steering wheel provided by the embodiment of the present disclosure. As shown in FIG. 2, the method for detecting the state of holding the steering wheel includes the following steps:

Step S202, a detection result is obtained by detecting the video stream collected from the target vehicle.

As at least one alternative embodiment, the above video stream may include at least one of the following: a depth video stream, an IR video stream, and an RGB video stream. Since a single use of RGB video stream or the IR video stream or a combination of RGB video stream and infrared IR video stream, it is impossible to determine the depth position of the driver's hand and the steering wheel, and detect the situation of false grip. Besides, when driving at night, using only RGB video streams may affect the judgment of state of the driver's hand and the steering wheel. Therefore, in the embodiments of the present disclosure, in order to make the detection result more comprehensive and better adaptable, the video stream may include multiple types, but need to contain the depth video stream.

In addition, in the embodiment of the present disclosure, the collection device for the video stream is not particularly limited, so long as the depth video streams can be collected; the installation position of the collection device for collecting the video stream is not particularly limited, as long as the above video streams can be collected. The collection perspective includes top-down perspective of the target vehicle, the perspective of the first person, and the perspective of the third person. The above-mentioned collection device may be a road-monitoring device, for example, a monitoring device at a road checkpoint.

In step S202, obtaining the detection result by detecting the video stream collected from the target vehicle includes: the image in the video stream is detected, the steering wheel position of the target vehicle and the hand position of the driver are acquired to obtain the detection result.

Step S204, an associated state of the first ROI information and the second ROI information carried in the detection result in a two-dimensional plane is acquired, wherein the first ROI information is the ROI information about the steering wheel of the target vehicle, and the second ROI information is the ROI information about the hand of the driver driving the target vehicle;

Among them, the ROI area here is the Region of Interest (ROI for short). In machine vision and image processing, the area to be processed which is outlined in the form of boxes, circles, ellipses, irregular polygons from the processed image is called the region of interest. This ROI region may be considered as a key region for image analysis during image analysis. The ROI information here is the coordinate position in the two-dimensional plane.

In at least one alternative embodiment, acquiring the associated state of the first ROI information and the second ROI information carried in the detection result in the two-dimensional plane includes: the positional relationship between the steering wheel position and the hand position of the driver is classified into different categories by a pre-trained classification model, where the categories include: the hand position is on the steering wheel position, and the hand position is off the steering wheel position.

In at least one alternative embodiment, acquiring the associated state of the first ROI information and the second ROI information carried in the detection result in the two-dimensional plane includes: the coincidence rate of the steering wheel position with the hand position of the driver in the two-dimensional plane is compared with the first threshold, as to determine the collective state of the first ROI information and the second ROI information in the two-dimensional plane, wherein the collective state is used to indicate whether there is an intersection between the first ROI information and the second ROI information in the two-dimensional plane.

For example, the coincidence rate of the steering wheel position and the hand position of the driver in the two-dimensional plane may be compared with the first threshold. When the comparison result is that the coincidence rate of the steering wheel position and the hand position of the driver in the two-dimensional plane is greater than the first threshold, that the hand position is on the steering wheel position may be determined; when the comparison result is that the coincidence rate of the steering wheel position and the hand position of the driver in the two-dimensional plane is not greater than the first threshold, that the hand position is off the steering wheel position may be determined, thereby determining the positional relationship between the hand of the driver and the steering wheel of the target vehicle.

Step S206, a depth information of the first ROI information and the depth information of the second ROI information carried in the detection result are acquired, and the depth state of the first ROI information and the second ROI information is determined.

As at least one alternative embodiment, the depth state of the first ROI information and the second ROI information includes: whether the depth range of the first ROI information and the depth range of the second ROI information are consistent.

In the embodiment, acquiring the depth information of the first ROI information and the depth information of the second ROI information carried in the detection result and determining the depth state of the first ROI information and the second ROI information includes: the depth model of the steering wheel position (first ROI information) may be obtained by modeling according to the depth of the steering wheel position (first ROI information); the actual depth of the hand position (second ROI information) and the theoretical depth of the hand position (second ROI information) in the depth model are acquired; the depth state of the steering wheel position (the first ROI information) and the hand position (the second ROI information) may be determined according to the actual depth and the theoretical depth of the hand position (second ROI information). Among them, the theoretical depth of the hand position (second ROI information) may be obtained by inputting the actual depth of the hand position (second ROI information) into the depth model of the steering wheel position (first ROI information), wherein the theoretical depth of the hand position is the output of the depth model, and the depth model of the steering wheel position may be obtained through training multiple sets of training data by machine learning.

In the embodiment, determining the depth state of the steering wheel position and the hand position according to the actual depth and the theoretical depth of the hand position may include: the difference between the actual depth of the hand position and the theoretical depth of the hand position in the depth model is compared with the second threshold, as to determine the depth state of the steering wheel position and the hand position. For example, when the difference between the actual depth of the hand position and the theoretical depth of the hand position in the depth model is greater than the second threshold, it is determined that the hand position and the steering wheel position are inconsistent, that is, the depth range of the first ROI information and the depth range of the second ROI information is inconsistent; when the difference between the actual depth of the hand position and the theoretical depth of the hand position in the depth model is not greater than the second threshold, it is determined that the hand position and the steering wheel position are consistent, that is, the depth range of the first ROI information and the depth range of the second ROI information is consistent.

Step S208, a current state between the hand of the driver and the steering wheel of the target vehicle is determined according to the associated state and the depth state.

As an alternative embodiment, determining the current state between the hand of driver and the steering wheel of the target vehicle according to the associated state and the depth state may include: the current state between the hand of the driver and the steering wheel of the target vehicle is determined as a virtual grip state when the hand position is on the steering wheel position, and the depth state indicates the hand position and the steering wheel position is inconsistent; the current state between the hand of the driver and the steering wheel of the target vehicle is determined as a solid grip state when the hand position is on the steering wheel position, and the depth state indicates the hand position and steering wheel position is consistent; and the current state between the hand of the driver and the steering wheel of the target vehicle is determined as a solid grip state when the hand position is off the steering wheel position.

As another alternative embodiment, determining the current state between the hand of the driver and the steering wheel of the target vehicle according to the associated state and the depth state includes: the current state between the hand of the driver and the steering wheel of the target vehicle is determined as a disengaged state when the collective state indicates that the first ROI information does not intersect with the second ROI information in the two-dimensional plane; the current state between the hand of the driver and the steering wheel of the target vehicle is determined as a virtual grip state when the collective state indicates that the first ROI information intersects with the second ROI information in the two-dimensional plane, and the depth state indicates that the depth range of the first ROI information and the depth range of the second ROI information is inconsistent; the current state between the hand of the driver and the steering wheel of the target vehicle is determined as a solid grip state when the collective state indicates that the first ROI information intersects with the second ROI information in the two-dimensional plane, and the depth state indicates that the depth range of the first ROI information and the depth range of the second ROI information is consistent.

Through the above steps, the video stream collected from the target vehicle may be detected to obtain the detection result; then the associated state of the first ROI information and the second ROI information carried in the detection result in the two-dimensional plane is acquired, wherein the first ROI information is the ROI information about the steering wheel of the target vehicle, and the second ROI information is the ROI information about the hand of the driver driving the target vehicle; the depth information of the first ROI information and the depth information of the second ROI information carried in the detection result are acquired to determine the depth state of the first ROI information and the second ROI information; and the current state between the hand of the driver and the steering wheel of the target vehicle is determined according to the associated state and depth state. In the embodiment, the video stream of the target vehicle may be detected to obtain the detection result, then the associated state and the depth state of the first ROI information and the second ROI information in a two-dimensional plane may be acquired, and the current state between the hand of the driver and the steering wheel of the target vehicle is determined according to the associated state and the depth state. Therefore, determining the state of the hand of the driver and the steering wheel of the target vehicle according to the first ROI information of the driver's hand and the second ROI information of the steering wheel, resulted from image analysis can be achieved. The above method not only can determine whether the current state between the hand of the driver and the steering wheel of the target vehicle is in the actual grip state or the disengaged state, but also can further determine the virtual grip state, thus achieving the technical effect of improving the accuracy of detecting the state between the hand of the driver and the steering wheel, thereby solving the technical problem that the related technology cannot detect the state of the holding the steering wheel while driving.

Furthermore, in order to further improve the detection accuracy of the state of holding the steering wheel, as an alternative embodiment of the present disclosure, the method may determine by a region growing method, whether the hand position and the steering wheel position is able to grow into a connected region according to the depth information of the first ROI information and the depth information of the second ROI information. When the judgment result is that the region growth map of the hand position and the region growth map of the steering wheel position is not able to be merged into a connected area, it indicates that the depth range of the hand position and the depth range of the steering wheel position is inconsistent, and that the current state between the hand of the driver and the steering wheel of the target vehicle is a virtual grip may be determined.

As another alternative embodiment, the image in the video stream may be detected to locate the arm position of the driver; the hand position obtained by the positioning model is corrected according to the arm position and obtain the corrected hand position; or whether the current state between the hand of the driver and the steering wheel of the target vehicle is a virtual grip state is further determined according to the position of the arm and the position of the steering wheel; wherein the arm position of the driver is represented by three-dimensional information of a predetermined number of points along the arm detected from the image in the video stream.

In order to refine the detection results, before acquiring the associated state of the first ROI information and the second ROI information carried in the detection result in the two-dimensional plane, the method for detecting the state of holding the steering wheel further includes: the number of a hand is detected; the associated state of the steering wheel position and the hand position of each driver's hands in the two-dimensional plane is acquired when the detected number of the hand is two.

Figure 3:
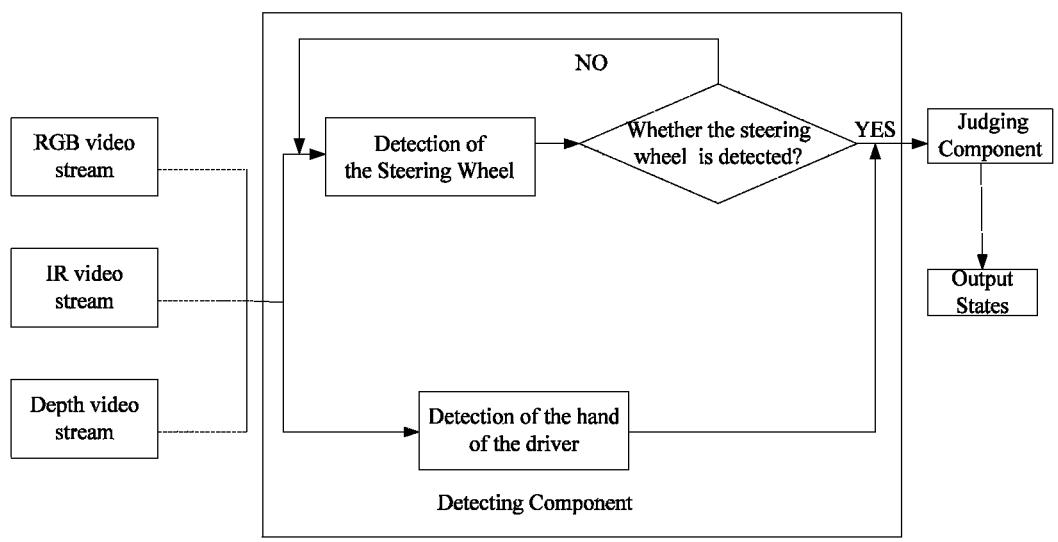
FIG. 3 is an alternative flowchart of a method for detecting a state of holding a steering wheel provided by the embodiment of the present disclosure.

From the above embodiment, it can be seen that current state between the hand of the driver and the steering wheel of the target vehicle includes one of the following: two hands off the steering wheel, one hand off the steering wheel, two-hand virtual grip state, one-hand virtual grip state, two-hand solid grip state, as shown in FIG. 3.

For example, FIG. 3 is an alternative flowchart of a method for detecting a state of holding a steering wheel provided by the embodiment of the present disclosure; as shown in FIG. 3, any one of the depth video stream, the combination of the depth video stream and the IR video stream, the combination of the depth video stream and the RGB video stream, the combination of the depth video stream, the IR video stream and the RGB video stream may be inputted into the detecting component. That is, the input video stream may be only the depth video stream, the combination of the depth video stream and the IR video stream, the combination of the depth video stream and the RGB video stream, the combination of the depth video stream, the IR video stream and the RGB video stream. The detecting component detects the received video stream, where the detection for the video stream by the detecting component includes the following two aspects.

In one aspect, detecting the image in the video stream to obtain the steering wheel position of the target vehicle may include: the initial steering wheel position of the target vehicle may be determined, and a first steering wheel position of the target vehicle is obtained by detecting within the initial position according to the image in the video stream. That is, the continuous image carried in the video stream input to the detecting component is detected, wherein the detection of the steering wheel may give an approximate range according to prior knowledge, that is, the initial position is obtained, and the detection is performed within the approximate range to acquire the first steering wheel position of the target vehicle. As shown in FIG. 3, after the detection on the steering wheel, whether the steering wheel is detected is judged, and if the judgment result is yes, the position of the steering wheel is outputted; otherwise, it returns to perform re-detection.

On the other hand, detecting the image in the video stream to obtain the hand position of the driver includes: the hand position of the driver corresponding to the image in the video stream is obtained through the positioning model, wherein the positioning model is obtained by training multiple sets of training data. Each set of training data in the multiple sets of training data includes: the image in the video stream and the hand position of the driver corresponding to the image in the video stream.

In the case where the steering wheel is detected, the first ROI information of the steering wheel and the second ROI information about the hand of the driver driving the target vehicle are output to the judging component shown in FIG. 3, and the judging component is activated.

As an alternative embodiment, the judging component is configured to acquire the associated state of the first ROI information and the second ROI information carried in the detection result in the two-dimensional plane, wherein the first ROI information is the ROI information about the steering wheel of the target vehicle, and the second ROI information is the ROI information about the hand of the driver driving the target vehicle; and configured to determine the current state between the hand of the driver and the steering wheel of the target vehicle according to the associated state.

Finally, the current state between the hand of the driver and the steering wheel of the target vehicle is output.

Through the method for detecting the state of holding the steering wheel provided by the embodiment of the present disclosure, a camera may be utilized to detect a target vehicle to obtain the video stream of the target vehicle, video stream (for example, any one of the depth video stream, the combination of depth video stream and the IR video stream, the combination of depth video stream and RGB video stream, the combination of the depth video stream, the IR video stream and the RGB video stream) may be analyzed in real-time. According to the correlation state and depth state of the steering wheel and hand position in the two-dimensional plane, in the detection result, and in some applications, combing with the positional relationship between the human limb, the hand and the steering wheel, whether the driver holds the steering wheel with both hands, with one-handed away from the steering wheel and without the steering wheel can be determined, furthermore, the situation of the virtual grip may also be accurately judged. At the same time, the method may also detect the driver's steering wheel disengagement and virtual grip at night. During the driving, the case of driver's one-hand or two-hand detachment and the virtual grip of the steering wheel may be monitored and alarmed, and the corresponding correction feedback mechanisms may be given, thus playing an important role to reduce the occurrence of traffic accidents.

As at least one alternative embodiment, when the detection result is that both hands are disengaged and the steering wheel is virtually gripped, a request instruction is generated, wherein the request instruction is used to control the target vehicle to start the automatic driving function, so as to prevent the target vehicle from a traffic accident.

Embodiment 3

An embodiment of the present disclosure also provides a device for detecting a state of holding a steering wheel. It should be noted that the device for detecting the state of holding the steering wheel according to an embodiment of the present disclosure can be used to execute the method for detecting the state of holding the steering wheel provided by an embodiment of the present disclosure. The following describes a device for detecting the state of holding the steering wheel provided by an embodiment of the present disclosure.

Figure 4:
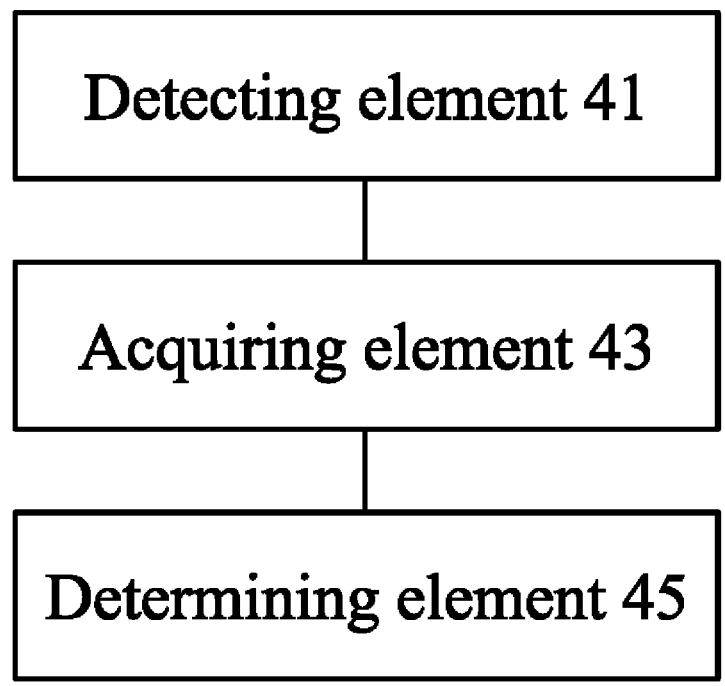
FIG. 4 is a diagram of a device for detecting a state of holding a steering wheel provided by the embodiment of the present disclosure.

FIG. 4 is a diagram of a device for detecting a state of holding a steering wheel provided by the embodiment of the present disclosure, as shown in FIG. 4, the device for detecting the state of holding the steering wheel may include:

a detecting element 41, configured to detect a video stream collected from a target vehicle to obtain a detection result;

an acquiring element 43, configured to acquire an associated state of first ROI information and second ROI information carried in the detection result in a two-dimensional plane, wherein the first ROI information is ROI information about the steering wheel of the target vehicle, and the second ROI information is ROI information about the hand of the driver driving the target vehicle;

a determining element 45, configured to determine a current state between the hand of the driver and the steering wheel of the target vehicle according to the associated state.

In the embodiment, the video stream collected from the target vehicle may be detected by the detecting element 41 to obtain the detection result; then the associated state of the first ROI information and the second ROI information carried in the detection result in the two-dimensional plane is acquired by the acquiring element 43, wherein the first ROI information is the ROI information about the steering wheel of the target vehicle, and the second ROI information is the ROI information about the hand of the driver of the target vehicle; and the current state between the hand of the driver and the steering wheel of the target vehicle is determined by the determining element 45 according to the associated state. In the embodiment, the video stream collected from the target vehicle is detected to obtain the detection result, then the associated state of the first ROI information and the second ROI information in the two-dimensional plane is acquired, and the current state between the hand of the driver and the steering wheel of the target vehicle is determined according to the associated state.

Therefore, determining the state of the hand of the driver and the steering wheel of the target vehicle according to the first ROI information about the steering wheel of the target vehicle and the second ROI information about the hand of the driver of the target vehicle resulted from image analysis can be achieved, and the technical effect of improving the accuracy of detecting the state between the hand of the driver and the steering wheel can also be achieved, thereby solving the technical problem that the related technology cannot detect the state of the holding the steering wheel while driving.

As at least one alternative embodiment, the video stream includes at least one of the following: a depth video stream, an IR video stream, and an RGB video stream.

As at least one alternative embodiment, the detecting element 41 is configured to detect the video stream collected from the target vehicle and obtain the steering wheel position of the target vehicle and the hand position of the driver to obtain the detection result.

As at least one alternative embodiment, the acquiring element 43 includes: an associated state acquiring component, which is configured to classify the positional relationship between the steering wheel position and the hand position of the driver into different categories by a pre-trained classification model, wherein the categories include: the hand position is on the steering wheel position, and the hand position is off the steering wheel position.

As at least one alternative embodiment, the acquiring element 43 includes: an associated state acquiring component, which is configured to compare a first threshold with a coincidence rate of the steering wheel position with the hand position of the driver in the two-dimensional plane, as to determine the collective state of the first ROI information and the second ROI information in the two-dimensional plane, wherein the collective state is used to indicate whether there is an intersection between the first ROI information and the second ROI information in the two-dimensional plane.

As at least one alternative embodiment, the acquiring element 43 includes: a depth state acquiring component, which is configured to acquire depth information of the first ROI information and depth information of the second ROI information carried in the detection result, and determine the depth state of the first ROI information and the second ROI information, wherein the depth state of the first ROI information and the second ROI information are used to indicate whether the depth range of the first ROI information and the depth range of the second ROI information are consistent.

As at least one alternative embodiment, the depth state acquiring component is further configured to determine by a region growing method, whether the hand position and the steering wheel position is able to grow into a connected region according to the depth information of the first ROI information and the depth information of the second ROI information.

As at least one alternative embodiment, the depth state acquiring component includes: a modeling sub-component, which is configured to obtain the depth model of the steering wheel position by modeling according to the depth of the steering wheel position; an acquiring sub-component, which is configured to acquire the actual depth of the hand position and the theoretical depth of the hand position in the depth model; a determining sub-component, which is configured to determine the depth state of the steering wheel position and the hand position according to the actual depth and the theoretical depth of the hand position, wherein the theoretical depth is calculated by inputting the actual depth of the hand position into the depth model of the steering wheel position and outputting, and the depth model of the steering wheel position is obtained by training multiple sets of training data through machine learning.

As at least one alternative embodiment, the detecting element 41 includes: a steering wheel position detecting component, which is configured to determine the initial steering wheel position of the target vehicle, and obtain the steering wheel position of the target vehicle by detecting within the initial position according to the image in the video stream.

As at least one alternative embodiment, the detecting element 41 includes: a hand position detecting component, which is configured to obtain the hand position of the driver corresponding to the image in the video stream through the positioning model, wherein the positioning model is obtained by training multiple sets of training data. Each set of training data in the multiple sets of training data includes: the image in the video stream and a hand position of the driver corresponding to the image in the video stream.

As at least one alternative embodiment, the detecting element 41 includes: an arm position detecting component, which is configured to detect the image in the video stream and locate to obtain the arm position of the driver; a hand position correcting component, configured to correct the hand position obtained by the positioning model according to the arm position and obtain the corrected hand position.

As at least one alternative embodiment, the determining element 45 includes: a first determining sub-element, which is configured to determine the current state between the hand of the driver and the steering wheel of the target vehicle is a solid grip state when the hand position is on the steering wheel position or the collective state indicates that the first ROI information intersects with the second ROI information in the two-dimensional plane; a second determining sub-element, which is configured to determine the current state between the hand of the driver and the steering wheel of the target vehicle is a disengaged state when the hand position is off the steering wheel position or the collective state indicates that the first ROI information doesn't intersect with the second ROI information in the two-dimensional plane.

As at least one alternative embodiment, the determining element 45 includes: a third determining sub-element, configured to determine the current state between the hand of the driver and the steering wheel of the target vehicle is a disengaged state when the collective state indicates that the first ROI information does not intersect with the second ROI information in the two-dimensional plane; a fourth determining sub-element, configured to determine the current state between the hand of the driver and the steering wheel of the target vehicle is a virtual grip state when the collective state indicates that the first ROI information does not intersect with the second ROI information in the two-dimensional plane, and the depth state indicates that the depth range of the first ROI information and the depth range of the second ROI information is inconsistent; a fifth determining sub-element, configured to determine the current state between the hand of the driver and the steering wheel of the target vehicle is a solid grip state when the collective state indicates that the first ROI information intersects with the second ROI information in the two-dimensional plane, and the depth state indicates that the depth range of the first ROI information and the depth range of the second ROI information is consistent.

As at least one alternative embodiment, the determining element 45 includes: a sixth determining sub-element, which is configured to determine the current state between the hand of the driver and the steering wheel of the target vehicle is a virtual grip state when the hand position is on the steering wheel position, and the depth state indicates that the depth range of the first ROI information and the depth range of the second ROI information is inconsistent; a seventh determining sub-element, which is configured to determine the current state between the hand of the driver and the steering wheel of the target vehicle is a solid grip state when the hand position is on the steering wheel position, and the depth state indicates that the depth range of the first ROI information and the depth range of the second ROI information is consistent; an eighth determining sub-element, which is configured to determine the current state between the hand of the driver and the steering wheel of the target vehicle is a disengaged state when the hand position is off the steering wheel position.

As at least one alternative embodiment, the current state between the hand of the driver and the steering wheel of the target vehicle includes one of the following: two hands off the steering wheel, one hand off the steering wheel, two-hand virtual grip state, one-hand virtual grip state, two-hand solid grip state.

As at least one alternative embodiment, the acquiring element is further configured to detect the number of a hand before acquiring the associated state of the first ROI information and the second ROI information carried in the detection result in the two-dimensional plane; and configured to, when the detected number of the hands is two, acquire the associated state of the steering wheel position and hand position of each hand of the driver in the two-dimensional plane.

The above-mentioned device for detecting the state of holding the steering wheel includes a processor and a memory. The above-mentioned detecting element 41, the acquiring element 43, and the determining element 45 are all stored as a program element in the memory, and the processor executes the above-mentioned program element stored in the memory to achieve the corresponding function.

The above processor contains a kernel, which retrieves the corresponding program element from the memory. One or more kernels can be set, and the state of the hand of the driver and the steering wheel of the target vehicle can be determined according to the associated state by adjusting the parameters of kernel.

The above memory may include non-permanent memory, random access memory (RAM) and/or non-volatile memory in a computer-readable medium, such as read-only memory (ROM) or flash memory (flash RAM), and the memory includes at least one memory chip.

According to another aspect of the embodiments of the present disclosure, a storage medium is also provided, which includes stored program, wherein the program executes the methods for detecting the state of holding the steering wheel.

According to another aspect of the embodiments of the present disclosure, a processer is also provided, which is configured to run a program, wherein the program executes the methods for detecting the state of holding the steering wheel.

The embodiment of the present disclosure also provides an apparatus, which includes a processor, a memory, and a program stored on the memory and executable on the processor. When the processor executes the program, the following steps are implemented: the video stream is detected to obtain the detection result; the associated states of the first ROI information and the second ROI information carried in the detection result in the two-dimensional plane is acquired, where the first ROI information is the ROI information about the steering wheel of the target vehicle, the second ROI information is ROI information about the hand of the driver driving the target vehicle; the current state between the hand of the driver and the steering wheel of the target vehicle is determined according to the associated state.

The embodiment of the present disclosure also provides a computer program product. When executed on a data processing apparatus, it is suitable for executing a program initialized with the following method steps: the video stream is detected to obtain the detection result; the associated state of the first ROI information and the second ROI information carried in the detection result in the two-dimensional plane is acquired, wherein the first ROI information is the ROI information of the steering wheel of the target vehicle, and the second ROI information is ROI information of the hand of the driver driving the target vehicle; the current state between the hand of the driver and the steering wheel of the target vehicle is determined according to the associated state.

The sequence numbers of the above embodiments of the present disclosure are for description only, and do not represent the advantages and disadvantages of the embodiments.

In the provided embodiments in this application, it should be understood that the disclosed technical content may be implemented in other ways, wherein above descried device embodiments are only schematic. For example, the division of the element may be a logical function division. In the actual implementation, there may be another division manner, such as multiple elements or components may be combined or integrated into another system, or some features can be ignored or not implemented. In addition, the displayed or discussed mutual coupling or direct coupling or communication connection may be indirect coupling or communication connection through some interfaces, elements or components, and can be in electrical or other forms.

The elements described as separate components may or may not be physically separated, and the components displayed as elements may or may not be physical elements, that is, they may be located in one place, or may be distributed on multiple elements. Some or all of the elements may be selected according to actual needs to achieve the purpose of the solution of this embodiment.

In addition, each functional unit in each embodiment of the present disclosure may be integrated into one detecting element, or each element may exist physically alone, or two or more elements may be integrated into one element. The above integrated element can be implemented in the form of hardware or software function element.

If the integrated element is implemented in the form of a software functional element and sold or utilized as an independent product, it may be stored in a computer-readable storage medium. Based on it, the technical solution of the present disclosure essentially or part of the contribution to the existing technology or all or part of the technical solution can be reflected in the form of software products, which is stored in a storage medium and includes several instructions to enable a computer device (which may be a personal computer, server, or network device, etc.) to perform all or part of the steps of the methods described in the embodiments of the present disclosure. And the forenamed storage media includes: U disk, Read-Only Memory (ROM), Random Access Memory (RAM), mobile hard disk, magnetic disk or optical disk and other media that can store program codes.

The above is only the preferred embodiments of the present disclosure. It should be pointed out that for those ordinary person skilled in the art, under the premise of the principle of the present disclosure, several improvements and retouches can be provided without an inventive effort, which should also fall into a protection scope of the present disclosure.

What is claimed is:

1. A method for detecting a state of holding a steering wheel, comprising:
   obtaining a detection result by detecting a video stream collected from a target vehicle;
   acquiring an associated state of first Region of Interest (ROI) information and second ROI information carried in the detection result in a two-dimensional plane, wherein the first ROI information is ROI information about the steering wheel of the target vehicle, and the second ROI information is ROI information about a hand of a driver driving the target vehicle;
   acquiring depth information of the first ROI information carried in the detection result and depth information of the second ROI information carried in the detection result, and determining a depth state of the first ROI information and the second ROI information, wherein the depth state of the first ROI information and the second ROI information is used to indicate whether a depth range of the first ROI information and a depth range of the second ROI information is consistent;
   determining a current state between the hand of the driver and the steering wheel of the target vehicle according to the associated state and the depth state.

2. The method as claimed in claim 1, wherein the video stream comprises at least one of following: a depth video stream, an Infrared Radiation (IR) video stream, and a Red Green Blue (RGB) video stream.

3. The method as claimed in claim 1, wherein obtaining the detection result by detecting the video stream collected from the target vehicle comprises: detecting an image in the video stream, and acquiring a steering wheel position of the target vehicle and a hand position of the driver to obtain the detection result.

4. The method as claimed in claim 3, wherein acquiring the associated state of the first ROI information and the second ROI information carried in the detection result in the two-dimensional plane comprises:
   classifying a positional relationship between the steering wheel position and the hand position of the driver into different categories by a pre-trained classification model, wherein the categories comprise: the hand position is on the steering wheel position, and the hand position is off the steering wheel position.

5. The method as claimed in claim 3, wherein acquiring the associated state of the first ROI information and the second ROI information carried in the detection result in the two-dimensional plane comprises:
   comparing a first threshold and a coincidence rate between the steering wheel position and the hand position of the driver in the two-dimensional plane as to determine a collective state of the first ROI information and the second ROI information in the two-dimensional plane, wherein the collective state is used to indicate whether there is an intersection between the first ROI information and the second ROI information in the two-dimensional plane.

6. The method as claimed in claim 1, further comprising: determining by a region growing method, whether the hand position and the steering wheel position is able to grow into a connected region according to the depth information of the first ROI information and the depth information of the second ROI information, as to determine the current state between the hand of the driver and the steering wheel of the target vehicle.

7. The method as claimed in claim 1, wherein acquiring the depth information of the first ROI information carried in the detection result and the depth information of the second ROI information carried in the detection result, and determining the depth state of the first ROI information and the second ROI information comprises:
   obtaining a depth model of the steering wheel position by modeling according to a depth of the steering wheel position;
   acquiring an actual depth of the hand position and a theoretical depth of the hand position in the depth model;
   determining the depth state of the steering wheel position and the hand position according to the actual depth and the theoretical depth of the hand position.

8. The method as claimed in claim 3, wherein detecting the image in the video stream to obtain the steering wheel position of the target vehicle comprises:
   determining an initial steering wheel position of the target vehicle, and detecting within the initial position according to the image in the video stream, as to obtain the steering wheel position of the target vehicle.

9. The method as claimed in claim 3, wherein detecting the image in the video stream to obtain the hand position of the driver comprises:
   obtaining the hand position of the driver corresponding to the image in the video stream through a positioning model, wherein the positioning model is obtained by training multiple sets of training data, and each set of training data in the multiple sets of training data comprises: an image in the video stream and a hand position of the driver corresponding to the image in the video stream.

10. The method as claimed in claim 9, wherein detecting the image in the video stream to obtain the hand position of the driver comprises:
    detecting the image in the video stream and locating to obtain an arm position of the driver;
    correcting according to the arm position, the hand position obtained by the positioning model, as to obtain the hand position.

11. The method as claimed in claim 10, wherein the arm position of the driver is represented by three-dimensional information of a predetermined number of points along an arm detected from the image in the video stream.

12. The method as claimed in claim 4, wherein determining the current state between the hand of the driver and the steering wheel of the target vehicle according to the associated state comprises:
    determining the current state between the hand of the driver and the steering wheel of the target vehicle is a solid grip state when the hand position is on the steering wheel position or the collective state indicates that the first ROI information intersects with the second ROI information in the two-dimensional plane;
    determining the current state between the hand of the driver and the steering wheel of the target vehicle is a disengaged state when the hand position is off the steering wheel position or the collective state indicates that the first ROI information doesn't intersect with the second ROI information in the two-dimensional plane.

13. The method as claimed in claim 12, wherein determining the current state between the hand of the driver and the steering wheel of the target vehicle according to the associated state and the depth state comprises:
  determining the current state between the hand of the driver and the steering wheel of the target vehicle is a disengaged state when the collective state indicates that the first ROI information does not intersect with the second ROI information in the two-dimensional plane;
  determining the current state between the hand of the driver and the steering wheel of the target vehicle is a virtual grip state when the collective state indicates that the first ROI information intersects with the second ROI information in the two-dimensional plane, and the depth state indicates that the depth range of the first ROI information and the depth range of the second ROI information is inconsistent;
  determining the current state between the hand of the driver and the steering wheel of the target vehicle is a solid grip state when the collective state indicates that the first ROI information intersects with the second ROI information in the two-dimensional plane, and the depth state indicates that the depth range of the first ROI information and the depth range of the second ROI information is consistent.

14. The method as claimed in claim 12, wherein determining the current state between the hand of the driver and the steering wheel of the target vehicle according to the associated state and the depth state comprises:
  determining the current state between the hand of the driver and the steering wheel of the target vehicle is a virtual grip state when the hand position is on the steering wheel position, and the depth state indicates that the depth range of the first ROI information and the depth range of the second ROI information is inconsistent;
  determining the current state between the hand of the driver and the steering wheel of the target vehicle is a solid grip state when the hand position is on the steering wheel position, and the depth state indicates that the depth range of the first ROI information and the depth range of the second ROI information is consistent;
  determining the current state between the hand of the driver and the steering wheel of the target vehicle is a disengaged state when the hand position is off the steering wheel position.

15. The method as claimed in claim 1, wherein the current state between the hand of the driver and the steering wheel of the target vehicle comprises one of following: two hands off the steering wheel, one hand off the steering wheel, two-hand virtual grip state, one-hand virtual grip state, two-hand solid grip state.

16. The method as claimed in claim 1, wherein before acquiring the associated state of the first ROI information and the second ROI information carried in the detection result in the two-dimensional plane, further comprising:
  detecting the number of a hand;
  acquiring an associated state of the steering wheel position and a hand position of each hand of the driver in the two-dimensional plane when the detected number of the hand is two.

17. A device for detecting a state of holding a steering wheel, comprising:
  at least one processor; and
  a computer readable storage, coupled to the at least one processor and storing at least one computer executable instructions thereon, which when the at least one computer executable instructions is executed by the at least one processor, cause the at least one processor to carry out following actions:
    obtaining a detection result by detecting a video stream collected from a target vehicle;
    acquiring an associated state of first Region of Interest (ROI) information and second ROI information carried in the detection result in a two-dimensional plane, wherein the first ROI information is ROI information about the steering wheel of the target vehicle, and the second ROI information is ROI information about a hand of a driver driving the target vehicle;
    acquiring depth information of the first ROI information carried in the detection result and depth information of the second ROI information carried in the detection result, and determining a depth state of the first ROI information and the second ROI information, wherein the depth state of the first ROI information and the second ROI information is used to indicate whether a depth range of the first ROI information and a depth range of the second ROI information is consistent;
    determining a current state between the hand of the driver and the steering wheel of the target vehicle according to the associated state and the depth state.

18. A non-transitory computer-readable storage medium, on which a computer program is stored, wherein the computer program is executed by a processor to carry out following actions:
  obtaining a detection result by detecting a video stream collected from a target vehicle;
  acquiring an associated state of first Region of Interest (ROI) information and second ROI information carried in the detection result, in a two-dimensional plane, wherein the first ROI information is ROI information about the steering wheel of the target vehicle, and the second ROI information is ROI information about a hand of a driver driving the target vehicle;
  acquiring depth information of the first ROI information carried in the detection result and depth information of the second ROI information carried in the detection result, and determining a depth state of the first ROI information and the second ROI information, wherein the depth state of the first ROI information and the second ROI information is used to indicate whether a depth range of the first ROI information and a depth range of the second ROI information is consistent;
  determining a current state between the hand of the driver and the steering wheel of the target vehicle according to the associated state and the depth state.

* * * * *